United States Patent
Xu et al.

(10) Patent No.: US 12,139,441 B1
(45) Date of Patent: Nov. 12, 2024

(54) METHOD OF LASER-CURING AND FORMING HONEYCOMB GRINDING BLOCK MADE FROM FINE-GRAINED DIAMONDS AND CERAMIC BINDING AGENT

(71) Applicant: HUAQIAO UNIVERSITY, Quanzhou (CN)

(72) Inventors: Yangli Xu, Quanzhou (CN); Zeling Yang, Quanzhou (CN); Guoqin Huang, Quanzhou (CN); Hui Huang, Quanzhou (CN); Xipeng Xu, Quanzhou (CN)

(73) Assignee: HUAQIAO UNIVERSITY, Quanzhou (CN)

( * ) Notice: Subject to any disclaimer, the term of this patent is extended or adjusted under 35 U.S.C. 154(b) by 0 days.

(21) Appl. No.: 18/404,921

(22) Filed: Jan. 5, 2024

(30) Foreign Application Priority Data

Sep. 20, 2023 (CN) .......................... 202311211788.6

(51) Int. Cl.
| | |
|---|---|
| *C04B 35/00* | (2006.01) |
| *B28B 1/00* | (2006.01) |
| *B33Y 10/00* | (2015.01) |
| *B33Y 70/00* | (2020.01) |
| *C04B 35/103* | (2006.01) |
| *C04B 38/00* | (2006.01) |
| *C04B 41/00* | (2006.01) |

(52) U.S. Cl.
CPC .......... *C04B 41/0036* (2013.01); *B28B 1/001* (2013.01); *B33Y 10/00* (2014.12); *B33Y 70/00* (2014.12); *C04B 35/103* (2013.01); *C04B 38/0006* (2013.01); *C04B 2235/3217* (2013.01); *C04B 2235/427* (2013.01); *C04B 2235/48* (2013.01); *C04B 2235/60* (2013.01); *C04B 2235/94* (2013.01)

(58) Field of Classification Search
CPC ............ C04B 41/0036; C04B 38/0006; C04B 35/103; B28B 1/001; B33Y 10/00; B33Y 70/00
See application file for complete search history.

(56) References Cited

FOREIGN PATENT DOCUMENTS

| | | |
|---|---|---|
| CN | 106312048 A | 1/2017 |
| CN | 110453112 A | 11/2019 |
| CN | 112692956 A | 4/2021 |
| CN | 113149002 A | 7/2021 |

(Continued)

*Primary Examiner* — Mathieu D Vargot

(57) ABSTRACT

A method of laser-curing and forming a honeycomb diamond grinding block made from fine-grained diamonds and a ceramic binding agent is provided. The method includes preparing a slurry, where components of the slurry, by mass ratios, include: 20-21 parts of photosensitive resin; 34.5-37 parts of aluminum-oxide powder; 4-5.5 parts of fine-grained diamond powder; 0.04-0.1 parts of a photoinitiator; a range of particle sizes of the fine-grained diamond powder is 6-8 μm; stirring the slurry to allow all components in the slurry to be fully mixed with each other to obtain a first printing material; feeding the first printing material into a light-curing printer to perform light-curing 3D printing to obtain a precursor of a finished product; and performing, by a high-temperature furnace, a degreasing operation and a high-temperature sintering treatment on the precursor to obtain the finished product of the honeycomb diamond grinding block.

6 Claims, 4 Drawing Sheets

(56) References Cited

FOREIGN PATENT DOCUMENTS

| | | | |
|---|---|---|---|
| CN | 113560564 | A | 10/2021 |
| GB | 881240 | A | 11/1961 |
| WO | 2017053850 | A2 | 3/2017 |

S1: Preparing a slurry, where components of the slurry, by mass ratios, includes: 20-21 parts of photosensitive resin; 34.5-37 parts of aluminum powder; 4-5.5 parts of fine-grained diamond powder; and 0.04-0.1 parts of a photoinitiator; particle sizes of the fine-grained diamond powder range from 6-8 μm S2: Stirring the slurry to allow all of the components in the slurry to be fully mixed with each other, until no air bubbles are generated, to obtain a first printing material, where the first printing material includes the aluminum powder and the fine-grained diamond powder S3: Feeding the first printing material that includes the aluminum powder and the fine-grained diamond powder into a light-curing printer to perform light-curing 3D printing to obtain a precursor of a finished product of the honeycomb diamond grinding block S4: Performing, by a high-temperature furnace, a degreasing operation and a high-temperature sintering treatment on the precursor of the finished product of the honeycomb diamond grinding block to obtain the finished product of the honeycomb diamond grinding block

FIG. 1

METHOD OF LASER-CURING AND FORMING HONEYCOMB GRINDING BLOCK MADE FROM FINE-GRAINED DIAMONDS AND CERAMIC BINDING AGENT

TECHNICAL FIELD

The present disclosure relates to a technical field of diamonds, and in particular to a method of laser-curing and forming a honeycomb grinding block made from fine-grained diamonds and a ceramic binding agent.

BACKGROUND

A fine-grained diamond superhard tool, prepared from a ceramic binding agent, is used to precisely grind and process semiconductor wafers, engine blades made from ceramic fibre composites, and other components. The fine-grained diamond superhard tool is of great significance for developing methods of processing high-performance semiconductor devices and manufacturing aerospace essential components. As application scenarios are expanded continuously, requirements for performance of the above components gets higher and higher. Therefore, shapes, preparation methods and performance of the fine-grained diamond superhard tool needs to be innovated. Therefore, developing laser additive method to manufacture the diamond superhard tool is of great significance.

Forming the components is achieved by processing. Main operations during the processing includes wired cutting, grinding, polishing, and so on. A fine-grained diamond tool is generally used in the polishing operation to reduce surface roughness of the components and improve accuracy of the components. A diamond tool prepared with the ceramic binding agent is a polishing tool that is commonly used. Using laser to light-cure and form a honeycomb grinding block made from fine-grained diamonds and the ceramic binding agent is an effective way to manufacture the high-performance diamond processing tool. However, adding fine-grained diamond powder to the ceramic binding agent results in a slurry being unable to be shaped easily, eventually, resulting in composites of the fine-grained diamond powder and the ceramic binding agent being unable to be applied for the light-curing and printing technology.

To solve the above technical problems, the CN patent application No. CN202011645208.0 discloses a ceramic-metal composite moulded piece, a preparation method thereof, and a wear-resistant piece. Ceramic particles and a binding agent are mixed and sintered to obtain a ceramic pre-product. When the ceramic pre-product maintains residual heat after the sintering, the ceramic pre-product is placed in a casting mould, melted metal is poured into the mould, and the ceramic-metal composite moulded piece is obtained by compressing the ceramic pre-produc and the melted metal in the mold. In this way, an interfacial binding strength between the metal and the ceramic is improved.

The CN patent application No. CN202010859846.6 discloses a ceramic composite material, a manufacturing method thereof, a housing of an electronic device, and an electronic device. The manufacturing methodl includes preparing a blank body, where the blank body includes a first pre-fabricated layer of a first ceramic material and a second pre-fabricated layer of a second ceramic material, the first pre-fabricated layer includes the first ceramic material, and the second pre-fabricated layer includes the second ceramic material and a pore-forming agent; heating the blank body to remove blinders, enabling the pore-forming agent is removed from the blank body; and sintering the blank body in which the pore-forming agent is removed to obtain a sintered body. Therefore, the first pre-fabricated layer forms a dense ceramic material layer, and the second pre-fabricated layer forms a poros ceramic material matrix.

The CN patent application No. CN202210717640.9 discloses a highly wear-resistant composite ceramic material and a manufacturing method thereof. Ceramic is a main material of the highly wear-resistant composite ceramic material, and particles of the ceramic are bonded with each other in two ways. For one of the two ways, the particles of the ceramic are bonded with each other by ionic bonds and covalent bonds. For the other of the two ways, the particles of the ceramic are bonded with each other by chemical bonds through polymers. Therefore, the highly wear-resistant composite ceramic material having two bonding states between the particles of the ceramic is formed. In this application, the ceramic is sintered twice to obtain the highly wear-resistant composite ceramic material having the two bonding states between the particles of the ceramic. A small amount of polymers are bonded to the particles of the ceramic through the chemical bonds, and the highly wear-resistant composite ceramic material formed in this way has higher wear resistance, so that overall wear resistance, toughness, and other performance of the ceramicare further enhanced.

The CN patent application No. CN202111672509.7 discloses a ceramic slurry and a preparing method thereof. The ceramic slurry includes: 54-62 wt % of a mixture of ceramic powder and a pore-forming agent, 1-2 wt % of a dispersant, 32-39 wt % of an organic solvent, and 4-5.5 wt % of a binding agent.

The CN patent application No. CN202010910748.0 discloses a metal-ceramic composite material being wear resistant and having long service life, and a preparing method thereof. The metal-ceramic composite material is obtained by casting a melted metal liquid into a ceramic pre-product. The ceramic pre-product includes: a zirconia toughened alumina (ZTA) ceramic coated by a Ni—P alloy, SiC, Ti, FeB, Ti3SiC2, a pore-forming agent, and a binding agent. The metal-ceramic composite material has satisfied wear resistance and satisfied service life.

The above published patent applications are all involved in manufacturing ceramic composite materials and applications of the ceramic composite materials, and disclose various improved technical solutions. The added composite materials, such as organic materials and metals, increase service lives of the ceramic composite materials to a large extent. In this way, performance of the composite material, which takes the ceramic as the binding agent, is improved. However, none of these patented technologies is involved in manufacturing the diamond processing tool or in ultra-precise processing. The manufacturing processes performed in the above patents are relatively complex and conventional, but does not efficiently improve applications of the tool made from the fine-grained diamonds and the ceramic binding agent in the technical field of ultra-precise processing. Advantages of wear resistance of the materials that use the ceramic as the binding agent are not applied, and therefore, the above-mentioned technical problems still exist.

SUMMARY OF THE DISCLOSURE

The inventor finds, from research, that the reason why the slurry containing fine-grained diamonds and the ceramic binding agent is unable to be solidified is related to grain sizes of the diamonds, a mass ratio of the diamonds in the slurry, and properties of the diamonds.

In an aspect, the present disclosure provides a method of laser-curing and forming a honeycomb diamond grinding block made from fine-grained diamonds and a ceramic binding agent, the method includes:

an operation S1: preparing a slurry, where components of the slurry, by mass ratios, include: 20-21 parts of photosensitive resin, 34.5-37 parts of aluminum-oxide powder, 4-5.5 parts of fine-grained diamond powder, and 0.04-0.1 parts of a photoinitiator; particle sizes of the fine-grained diamond powder range from 6-8 μm; and the aluminum-oxide powder serves as the ceramic binding agent;

an operation S2: stirring the slurry to allow all of the components in the slurry to be fully mixed with each other, until no air bubbles are generated, to obtain a first printing material, where the first printing material includes the aluminum-oxide powder and the fine-grained diamond powder;

an operation S3: feeding the first printing material that includes the aluminum-oxide powder and the fine-grained diamond powder into a light-curing printer to perform light-curing 3D printing to obtain a precursor of a finished product of the honeycomb diamond grinding block; and an operation S4: performing, by a high-temperature furnace, a degreasing operation and a high-temperature sintering treatment on the precursor of the finished product of the honeycomb diamond grinding block to obtain the finished product of the honeycomb diamond grinding block.

In some embodiments, particle sizes of the aluminum-oxide powder range from 1-8 μm.

In some embodiments, the operation S2 includes: using a mechanical mixer to stir the slurry at a speed of 2600 r/min for 3 hours to fully mix the components in the slurry.

In some embodiments, in the operation S3, the light-curing printer prints printing layers to build the precursor of the finished product of the honeycomb diamond grinding block. Each of the printing layers has a thickness of 25 μm, an exposure energy density of 85 mW/cm$^2$, and an exposure time length of 1.5s for exposing each of the printing layers.

In some embodiments, the operation S4 includes: performing the degreasing operation at a temperature not greater than 700° C.; and performing the high-temperature sintering treatment at a temperature not greater than 900° C.

In some embodiments, in the operation S4, the precursor of the finished product of the honeycomb diamond grinding block has a shrinking percentage of 10% relative to the finished product of the honeycomb diamond grinding block.

In some embodiments, honeycombs of the finished product of the honeycomb diamond grinding block have a diameter of 10 mm, and the finished product of the diamond grinding block has a height of 5 mm.

In some embodiments, the method further includes an operation: analyzing and detecting, by an ultrasonic scanning microscope, the finished product of the diamond grinding block.

In summary, for the method of laser-curing and forming the honeycomb grinding block made from the fine-grained diamonds and the ceramic binding agent in the present disclosure, the mass ratio of each component in the formulation of the slurry and the range of particle sizes of each component in the slurry are given. Subsequently, the laser-curing and forming operation is performed to print the precursor of the finished product of the grinding block made from the fine-grained diamonds and the ceramic binding agent. Compared to the related art, the diamond grinding block prepared based on the present disclosure has high quality and is formed at a high forming speed, a shape of the diamond grinding block is not limited, and the diamond grinding block having a complex shape can be formed.

BRIEF DESCRIPTION OF THE DRAWINGS

In order to more clearly illustrate the technical solutions in the embodiments of the present disclosure, the accompanying drawings for describing the embodiments will be introduced briefly in the following. It is understandable that the following accompanying drawings shows only some of the embodiments of the present disclosure, and therefore, the following accompanying drawings shall not be interpreted as limiting the scope of the present disclosure. Any ordinary skilled person in the art may obtain other accompanying drawings based on the accompanying drawings without any creative work.

FIG. 1 is a flow chart of a method of laser-curing and forming a honeycomb grinding block made from fine-grained diamonds and a ceramic binding agent according to one embodiment of the present disclosure.

DETAILED DESCRIPTION

In order to make the purpose, technical solutions and advantages of the present disclosure clearer and more understandable, technical solutions in the embodiments of the present disclosure will be described clearly and completely in the following. In the embodiments, any operation that is not indicated by specific conditions is performed in accordance with conventional conditions or conditions recommended by manufacturers. Any reagent or equipment that is not indicated with a manufacturer is a conventional product that can be obtained commercially.

FIG. 1 is a flow chart of a method of laser-curing and forming a honeycomb grinding block made from fine-grained diamonds and a ceramic binding agent according to an embodiment of the present disclosure. The method includes following operations.

In an operation S1, a slurry is prepared.

In the present embodiment, it is found from research that a reason why the slurry containing fine-grained diamonds and a ceramic binding agent is unable to be solidified is related to grain sizes of the diamonds, a mass ratio of the diamonds in the slurry, and properties of the diamonds. Therefore, in the present disclosure, the mass ratio of the diamonds in a formulation thereof and the grain sizes of the diamonds are continuously adjusted to obtain a range of mass ratios of the diamonds and a range of the grain sizes of the diamonds that allow the slurry to be shaped. Details of the formulation are as follows.

Components of the slurry, by mass ratios, includes: 20-21 parts of photosensitive resin; 34.5-37 parts of aluminum-oxide powder (which serves as the ceramic binding agent); 4-5.5 parts of fine-grained diamond powder; and 0.04-0.1 parts of a photoinitiator. A range of particle sizes of the fine-grained diamond powder is 6-8 μm; a range of particle sizes of the photosensitive resin is 1-8 μm; and a range of particle sizes of the aluminum-oxide powder is 1-8 μm. By following the above formulation, the prepared slurry can be shaped optimally.

Figure 2:
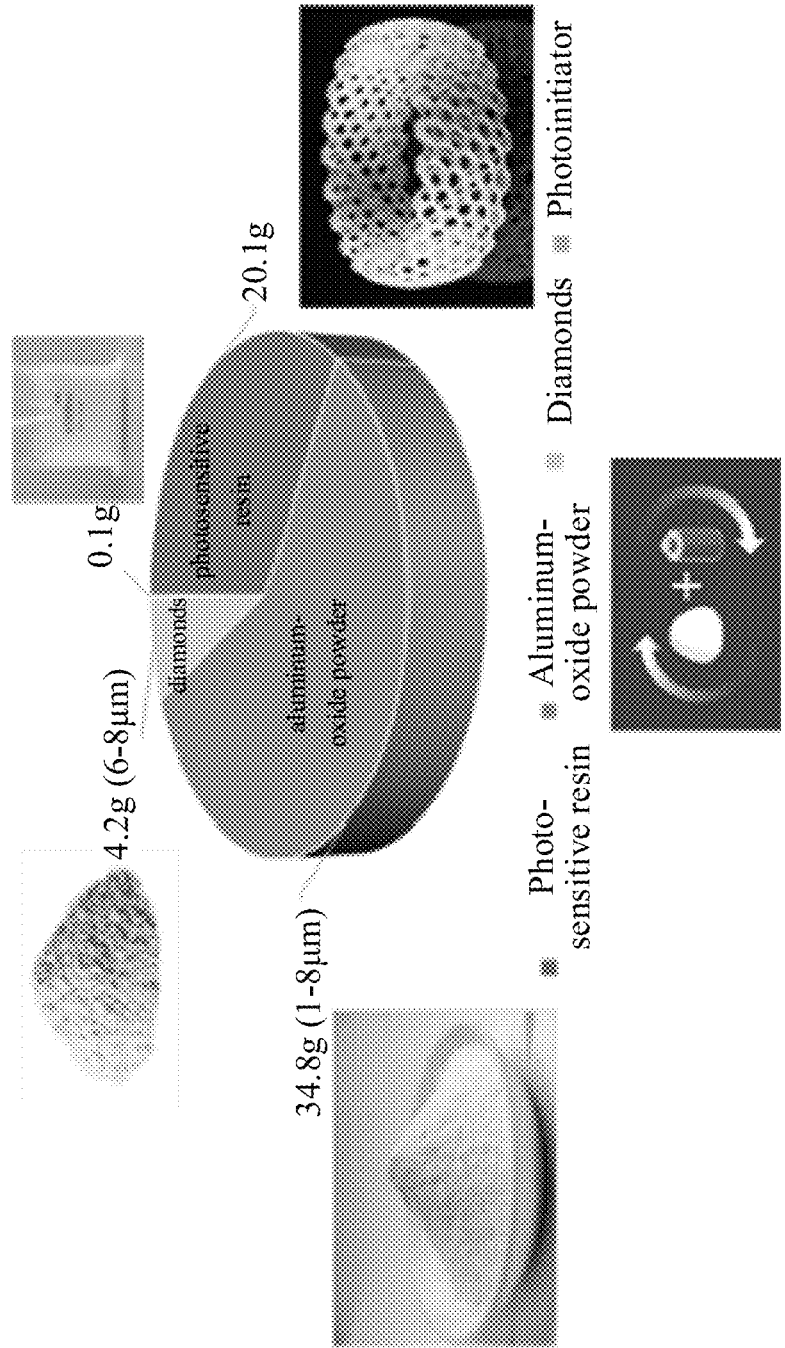
FIG. 2 shows components of the slurry according to one embodiment of the present disclosure.

As shown in FIG. 2, in one embodiment, a mass of the photosensitive resin is 20.1 g; the mass of the aluminum-oxide powder is 34.8 parts (particle sizes of the aluminum-oxide powder are in a range of 1-8 μm); a mass of the fine-grained diamond powder is 4.2 g (particle sizes of the diamond powder are in a range of 6-8 μm); and a mass of the photoinitiator is 0.1 g.

In an operation S2, the slurry is stirred to allow all of the components in the slurry to be fully mixed with each other until no air bubbles are generated, so as to obtain a first printing material The first printing material includes the aluminum-oxide powder (which serves as the ceramic binding agent) and the fine-grained diamond powder.

Specifically, the slurry is stirred by a mechanical mixer at a speed of 2600 r/min until no air bubbles are generated, so that the components in the slurry are fully mixed and no obvious block is generated.

The mixing time thereof may be 3 hours, which is adjustable according to actual requirements and is not limited thereto. Of course, the speed of the mechanical mixer is also adjustable according to actual requirements and is not limited thereto.

In an operation S3, the first printing material that includes the aluminum-oxide powder and the fine-grained diamond powder is fed into a light-curing printer to perform light-curing 3D printing to obtain a precursor of a finished product of a honeycomb diamond grinding block.

The light-curing printer can be a digital light processing (DLP) 3D printer. Parameters for the laser-curing and forming include: a thickness of each of printing layers forming the precursor of the finished product of the honeycomb diamond grinding block being 25 μm, an exposure energy density being 85 mW/cm$^2$, and an exposure time length being 1.5s for exposing one printing layer.

In an operation S4, a degreasing operation and a high-temperature sintering treatment are performed, by a high-temperature furnace, on the precursor of the finished product of the honeycomb diamond grinding block, to obtain the finished product of the honeycomb diamond grinding block.

In the present embodiment, the honeycomb diamond grinding block obtained by performing the laser-curing and forming operation is a mixture of the diamonds, the ceramic, and impurities such as the resin. The degreasing operation mainly removes, through the heat treatment, the impurities from the diamond grinding block completely. By performing the two operations, the degreasing operation and the high-temperature sintering densification, the resin, the dispersant, the photoinitiator, and other impurities inside honeycomb diamond grinding block are fully volatilized.

Figure 3:
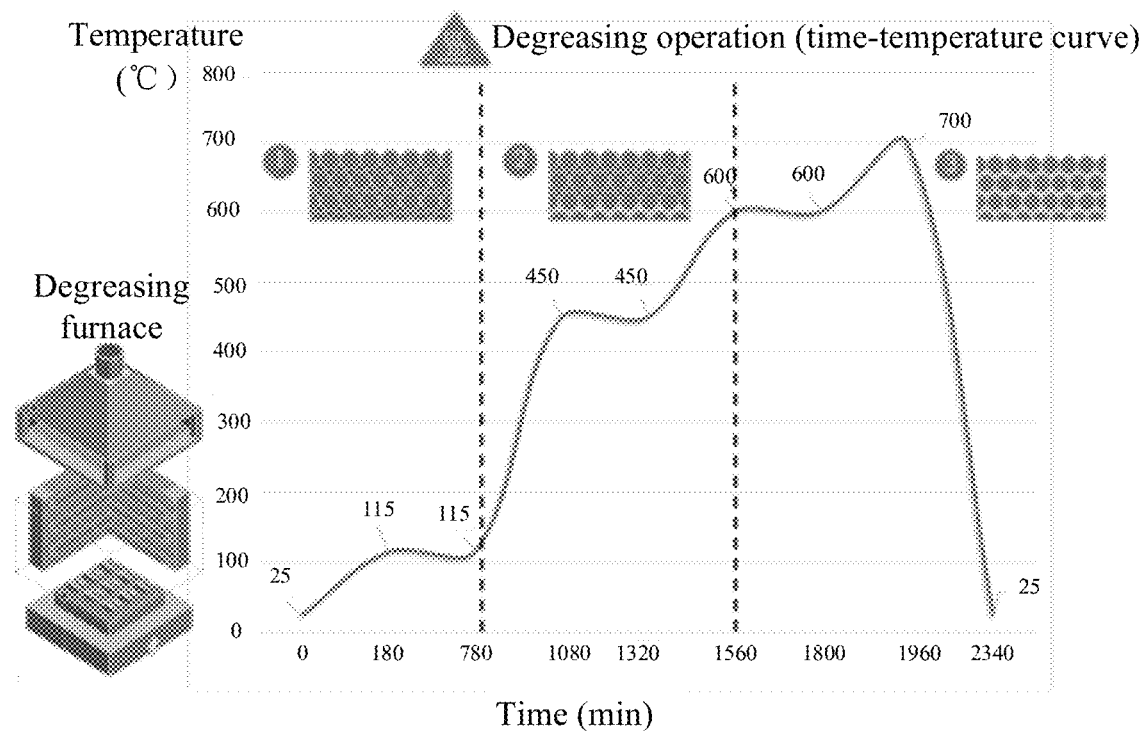
FIG. 3 is a temperature-time curve of a degreasing operation according to one embodiment of the present disclosure.
Figure 4:
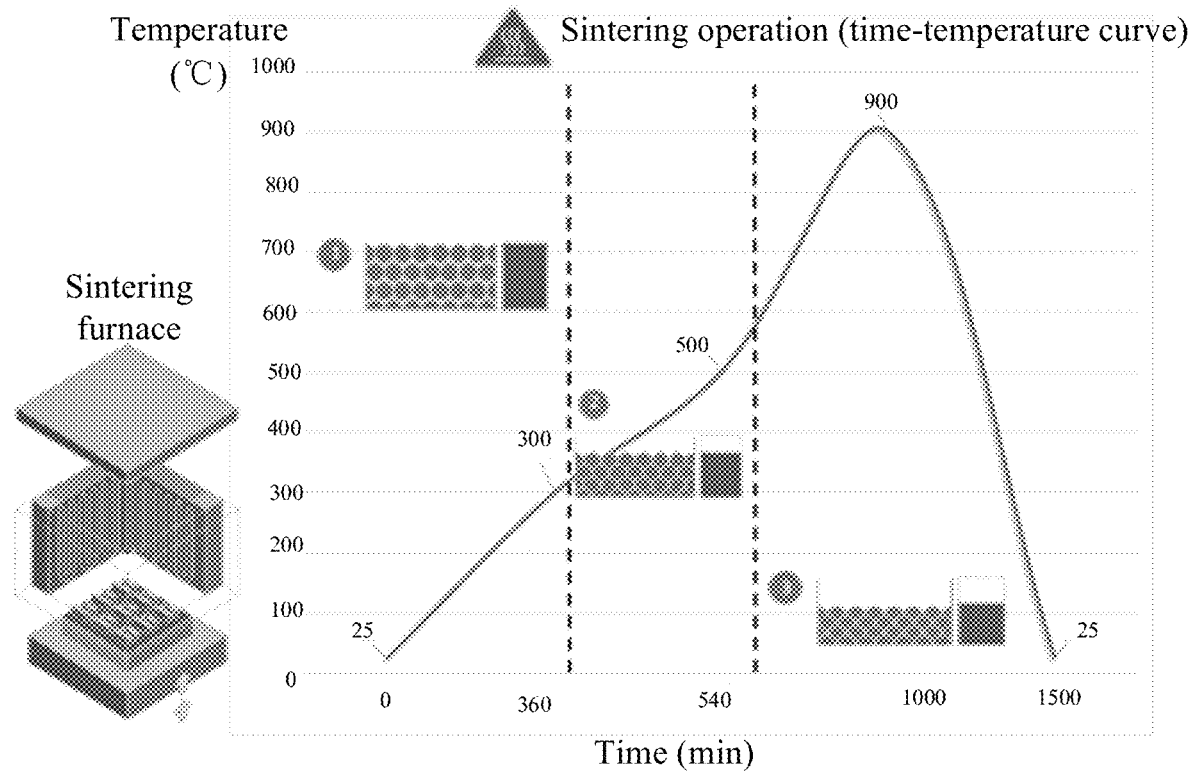
FIG. 4 is a temperature-time curve of a high-temperature sintering operation according to one embodiment of the present disclosure.

However, it is found in the research that when temperatures during the degreasing operation and the sintering treatment are excessively high, the diamonds therein are graphitized. Therefore, after experiments, optimal temperatures for the degreasing operation and the high-temperature sintering treatment are determined. As shown in FIG. 3 and FIG. 4, the temperature of the degreasing operation is determined to be not greater than 700° C., and the temperature of the high-temperature sintering treatment is determined to be not greater than 900° C., so that the diamonds in the slurry are prevented from being graphitized.

In the above embodiment, the precursor of the finished product of the honeycomb diamond grinding block has a shrinking percentage of 10% relative to the finished product of the honeycomb diamond grinding block.

Figure 5:
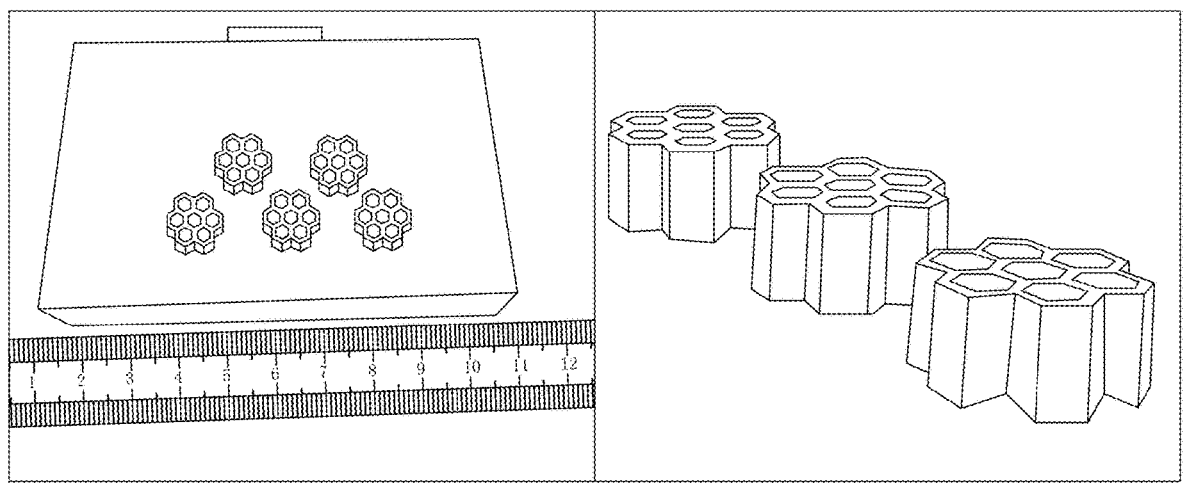
FIG. 5 shows actual products of the honeycomb grinding blocks according to one embodiment of the present disclosure.
Figure 6:
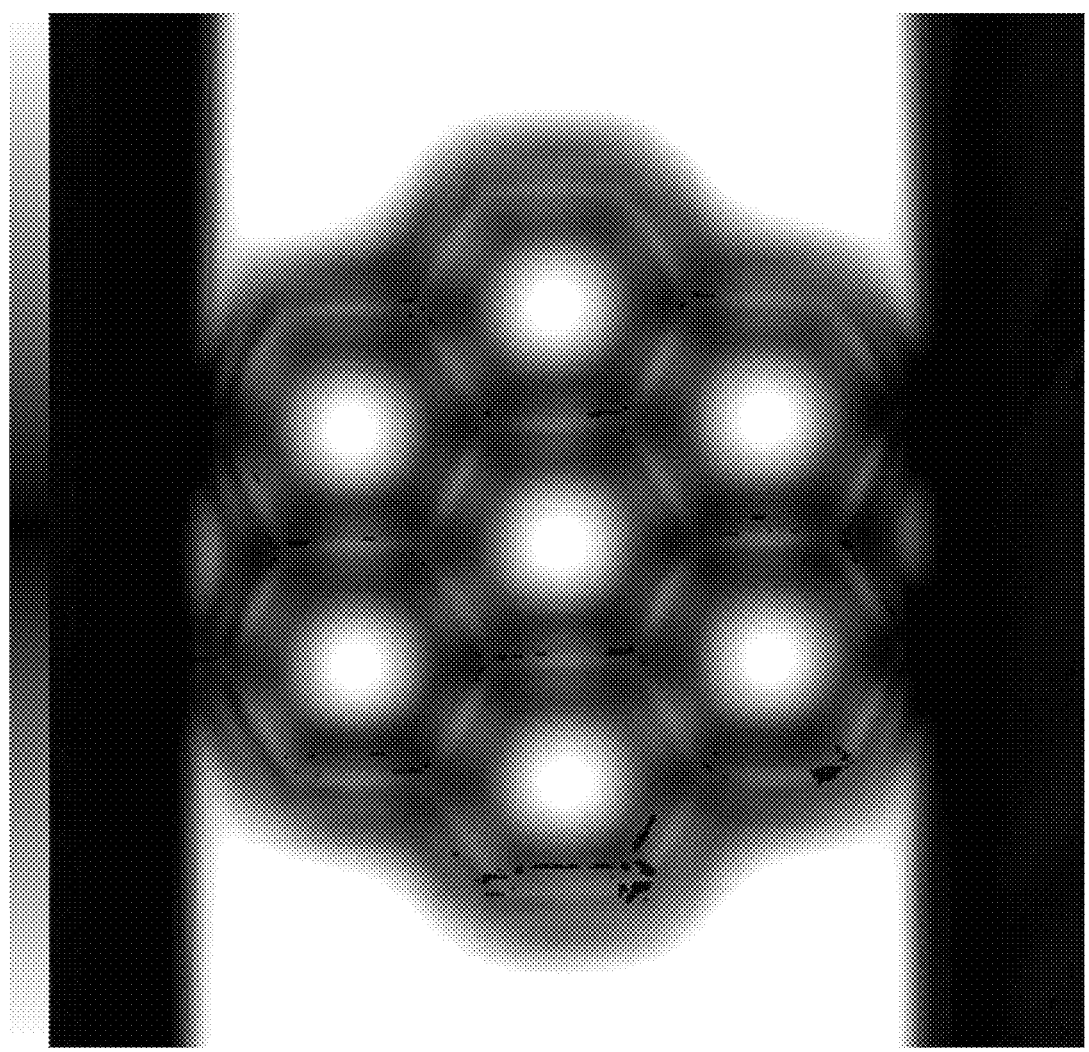
FIG. 6 is an analytical detection image captured by an ultrasonic scanning microscope according to one embodiment of the present disclosure.

As shown in FIG. 5, honeycombs of the finished product of the diamond grinding block have a diameter of 10 mm, and the finished product of the diamond grinding block has a height of 5 mm. The finished product of the diamond grinding block is analyzed and examined by an ultrasonic scanning microscope. Microscopic structures of the finished product of the diamond grinding block are shown in FIG. 6, and no obvious defects are observed.

In summary, for the method of laser-curing and forming the honeycomb grinding block made from the fine-grained diamonds and the ceramic binding agent, the mass ratio and the range of the particle sizes of each component in the formulation of the slurry are given. Further, the laser-curing and forming operation is performed to print the precursor of the finished product of the diamond grinding block made from the fine-grained diamonds and the ceramic binding agent. Compared to the related art, the diamond grinding block prepared by the present disclosure has high quality and is formed at a higher forming speed, a shape of the diamond grinding block is not limited, and the diamond grinding block having a complex shape can be formed.

The above-described embodiments are some of, not all of, the embodiments of the present disclosure. The detailed description of the embodiments of the present disclosure is not intended to limit the scope of the present disclosure, but only indicates selected embodiments of the present disclosure. All other embodiments, which are obtained by any ordinary skilled person in the art based on the embodiments in the present disclosure without creative work, shall fall within the scope of the present disclosure.

What is claimed is:

1. A method of laser-curing and forming a honeycomb diamond grinding block made from fine-grained diamonds and a ceramic binding agent, the method comprising:
   an operation S1: preparing a slurry, wherein components of the slurry, by mass ratios, comprise 20-21 parts of photosensitive resin, 34.5-37 parts of aluminum-oxide powder, 4-5.5 parts of fine-grained diamond powder, and 0.04-0.1 parts of a photoinitiator; particle sizes of the fine-grained diamond powder range from 6-8 μm; particle sizes of the aluminum-oxide powder range from 1-8 μm; and the aluminum-oxide powder serves as the ceramic binding agent;
   an operation S2: stirring the slurry to allow all of the components in the slurry to be fully mixed with each other, until no air bubbles are generated, to obtain a printing material, wherein the printing material comprises the aluminum-oxide powder and the fine-grained diamond powder;
   an operation S3: feeding the printing material that comprises the aluminum-oxide powder and the fine-grained diamond powder into a laser-curing printer to perform laser-curing 3D printing to obtain a precursor of a finished product of the honeycomb diamond grinding block; and
   an operation S4: performing, by a high-temperature furnace, a degreasing operation and a high-temperature sintering treatment on the precursor of the finished product of the honeycomb diamond grinding block to obtain the finished product of the honeycomb diamond grinding block; wherein a temperature of the degreasing operation is not greater than 700° C., and a temperature of the high-temperature sintering treatment is not greater than 900° C.

2. The method according to claim 1, wherein the operation S2 comprises:
using a mechanical mixer to stir the slurry at a speed of 2600 r/min for 3 hours to fully mix the components in the slurry.

3. The method according to claim 1, wherein, in the operation S3, the laser-curing printer prints printing layers to build the precursor of the finished product of the honeycomb diamond grinding block; each of the printing layers has a thickness of 25 μm, an exposure energy density of 85 mW/cm$^2$, and an exposure time length of 1.5s for exposing each of the printing layers is used.

4. The method according to claim 1, wherein, in the operation S4, the precursor of the finished product of the honeycomb diamond grinding block has a shrinking percentage of 10% relative to the finished product of the honeycomb diamond grinding block.

5. The method according to claim 1, wherein honeycombs of the finished product of the honeycomb diamond grinding block have a diameter of 10 mm, and the finished product of the diamond grinding block has a height of 5 mm.

6. The method according to claim 1, wherein the method further comprises:
analyzing and detecting, by an ultrasonic scanning microscope, the finished product of the diamond grinding block.

* * * * *